Nov. 25, 1958 J. W. FAUST, JR 2,861,931
ELECTROLYTIC ETCHING PROCESSES
Filed Aug. 29, 1956
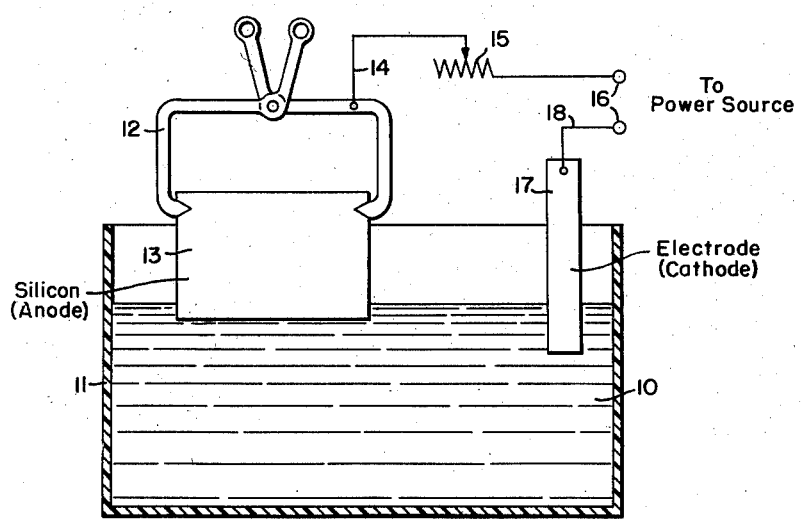
WITNESSES
INVENTOR
John W. Faust, Jr.
BY
ATTORNEY

2,861,931

ELECTROLYTIC ETCHING PROCESSES

John W. Faust, Jr., Penn Township, Allegheny County, Pa., assignor to Westinghouse Electric Corporation, East Pittsburgh, Pa., a corporation of Pennsylvania Application August 29, 1956, Serial No. 606,856

5 Claims. (Cl. 204—141)

The invention relates generally to electrolytic etching and particularly to the electrolytic etching of silicon.

In working with silicon, particularly in making transistors and other similar electrical devices, the need for an electrolytic etching process which will give a clean surface for making electrical connections has been great.

When a satisfactory electrolytic etching process for silicon is available, the surfaces may be cleaned and strained portions around the electrical contact may be properly and rapidly etched away, thereby relieving stresses, made by joining an electrical member to the silicon.

Many attempts have been made to electrolytically etch silicon with electrolytes comprising an aqueous media, for example, hydrofluoric acid mixed with water. These attempts have been unsuccessful. It has been given as a suggested reason that electrolytic etching could not be accomplished because of the oxide layer usually found on the silicon and produced during the etching in an aqueous media.

The object of the invention is to provide an electrolyte which in cooperation with the flow of electric current will effect an etching of silicon.

Other objects of the invention will, in part, be obvious and will, in part, appear hereinafter.

The invention accordingly comprises the several steps and the relation and order of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing, in which: the single figure is a view in side elevation of apparatus that may be used to carry out the etching process.

In accordance with the invention, it has been discovered that silicon may be satisfactorily electrolytically etched in an electrolyte consisting essentially of a small proportion by volume of 48% to 50% hydrofluoric acid and a large proportion by volume of an anhydrous hydrophilic organic solvent.

Referring now to the drawing, an electrolyte 10 is introduced into a container 11 of some suitable plastic, such, for example, as polyethylene or tetrafluoroethylene, which will withstand attack of hydrofluoric acid. A tongs 12 and other suitable means (not shown) are provided for supporting a silicon member or element 13 at any predetermined level so that it may at will be lowered into the electrolyte 10.

The tongs will be connected through a conductor 14 to a rheostat 15 to a source of direct electrical current 16 to render the silicon anodic. The rheostat 15 may be utilized to control the current flow in order to regulate the rate at which the silicon is etched. Any well known type of ammeter (not shown) may be connected into the circuit extending from the source of power to the tongs 12 to indicate the electric current flowing. In order to complete the circuit a cathodic electrode 17 of graphite or platinum, for example, is suspended in the electrolyte and connected by conductor 18 to the opposite side of the source of current from the tongs 12.

The voltage to be applied to the silicon member 13 can be predetermined depending on the conditions under which the etching is to be carried on. Sources of current of suitable voltage and amperage are well known and readily available for use in the process. Devices, other than the tongs 12, are well known in the art and may be provided for holding or suspending the silicon anode and the cathode 17 and moving them relative to the electrolyte.

The electrolyte 10 may be made by mixing hydrofluoric acid with anhydrous organic solvents. Hydrofluoric acid as obtained commercially is usually a solution of 48% to 50% hydrogen fluoride by weight in water and has a specific gravity of the order of 1.15. Hydrogen fluoride which meets this specification has been found to be satisfactory for making an effective electrolyte for etching silicon.

It has been found that there are many substantially anhydrous organic solvents both chain and cyclic compounds that may be utilized in preparing the electrolytes for the etching process. These organic solvents should have two properties: (a) must be liquid and (b) must be at least partially miscible with water. These may comprise monohydric and polyhydric alcohols, ethers, carboxylic acids, amines and ketones. Mixtures of two or more may be employed. Materials that have been used with success are:

Alcohols—methanol, ethanol, isopropyl alcohol, n-butyl alcohol, tertiary butyl alcohol and glycerol.

Acids—acetic acid and propionic acid.

Glycols—diethylene glycol, monomethyl ether, and ethylene glycol.

Amines—formamide and pyridine.

Ethers and ketones—dioxane and acetone.

Mixtures comprising 100 cubic centimeters of ethylene glycol and 48%–50% hydrofluoric acid in amounts of from about 2.5 cubic centimeters to about 15 cubic centimeters produce a satisfactory electrolyte. Satisfactory electrolytes are also obtained by mixing from about 5 to 10 cubic centimeters of hydrofluoric acid with about 100 cubic centimeters of absolute ethanol.

Many tests were made utilizing from 1 to 30% concentrated hydrofluoric acid in ethanol and good results were obtained. In a number of tests utilizing an electrolyte containing a 10% hydrofluoric acid in solution in ethanol with water, up to about 17% gave satisfactory results.

In etching crystals of silicon of an area of one square centimeter with the foregoing electrolytes, currents ranging from around 20 milliamps. to 800 milliamps. per sq. cm. of surface area gave successful etching. The time required for an etching operation to remove about a .1 mil thick surface layer of such silicon member was usually of the order of 30 minutes. In one modification of the process etching was effected with currents of less than 20 milliamps. per square centimeter but it was slow.

When a small amount of hydrogen fluoride (about 2½%) was present in the electrolyte the current flow was usually low but as the proportion of hydrofluoric acid was increased the initial current flow was relatively high.

It will be readily appreciated that the hydrofluoric acid in the electrolyte and the rate of flow of current may be varied greatly and still satisfactory etching obtained. The time required will depend on the amount of hydrofluoric acid present and the rate of current flow. These and the time can be varied to meet the etching problem at hand by anyone skilled in the art.

The preparation of the silicon member 13 to be etched will depend on the purpose for which it is to be utilized. If it is desired to provide a silicon member having an etched face for joining to another metallic member for making electrical apparatus the silicon member will have a face prepared on it either by polishing or lapping or both or other means which is of a size and shape required for the joining operation.

After the face has been prepared on the silicon member, means can be provided for applying the electrolyte or introducing the face on the silicon member to be etched into the electrolyte and located in proper relationship to the electrode 17.

The etching may also be effected in accordance with the teachings of this invention in combination with known methods. If it is desired to etch a grown junction, such as found in the making of transistors, an electrolytic stream technique may be employed. In order to etch a large area diode, specially designed conforming cathodes will be employed. Thus, for different operations the invention may be employed with the proper known technique.

The etching process of this invention is particularly suitable for post-etching semiconductor devices prior to potting. These comprise fused junction devices and other diode and transistor devices having soldered or fused or evaporated areas thereon.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

I claim as my invention:

1. In the process of etching silicon, the steps of mechanically polishing the silicon to remove deleterious matter from the surface, applying to the silicon an electrolyte comprising only a mixture of from 1% to 30% by volume of concentrated hydrofluoric acid and the balance being an anhydrous hydrophilic solvent comprising at least one selected from the group consisting of monohydric and polyhydric alcohols, ethers, carboxylic acids, amines, esters and ketones, and causing an electric current to flow through the silicon as an anode and the electrolyte to etch the silicon.

2. In the process of electrolytic etching of silicon, the step of grinding and polishing the silicon to be etched to remove deleterious matter from the surface and provide a level face, applying an electrolyte composed of from 2.5 to 15 parts by volume of 48% to 50% hydrofluoric acid mixed with 100 parts by volume of an anhydrous hydrophilic solvent comprising at least one selected from the group consisting of monohydric and polyhydric alcohols, ethers, carboxylic acids, amines, esters and ketones and causing an electric current of from 20 to 800 milliamperes per square centimeter of silicon surface to be etched to flow through the silicon as the anode and the electrolyte to cooperate in effecting the etching of the silicon.

3. In the process of electrolytically etching of silicon, the steps of grinding and polishing the silicon to be etched to remove deleterious matter and provide a level surface, applying an electrolyte composed of from 2.5 to 15 parts by volume of 48% to 50% hydrofluoric acid mixed with 100 parts by volume of anhydrous ethylene glycol and causing an electric current of from 20 to 800 milliamperes per square centimeter of silicon surface to be etched to flow through the silicon as the anode and the electrolyte to cooperate in the etching process.

4. In the process of electrolytically etching of silicon, the steps of grinding and polishing the silicon to be etched to remove deleterious matter and provide a level surface, applying an electrolyte composed of from 1% to 30% of concentrated hydrofluoric acid and the balance being absolute ethanol and causing electric current of from 20 to 800 milliamperes per square centimeter of silicon surface to be etched to flow through the silicon as the anode and the electrolyte to cooperate in the etching process.

5. In the process of electrolytically etching of silicon, the steps of grinding and polishing the silicon to be etched to remove deleterious matter and expose clean silicon for the etching process, applying an electrolyte composed of about 2.5 to 15 cubic centimeters of 48% to 50% hydrofluoric acid mixed with 100 cubic centimeters of anhydrous ethanol, and passing an electric current of from 20 to 800 milliamperes per square centimeter of silicon surface exposed through the silicon as an anode and the electrolyte to cooperate in the etching of the silicon.

References Cited in the file of this patent

UNITED STATES PATENTS

| | | |
|---|---|---|
| 2,656,496 | Sparks | Oct. 20, 1953 |
| 2,686,279 | Barton | Aug. 10, 1954 |

OTHER REFERENCES

Bell System Technical Journal, volume 35, March 1956, pp. 333 to 347 (page 346 pertinent), by Uhlir.

Journal of the Electrochem. Soc., vol. 102, No. 10, October 1955, article by Camp, pp. 586–593.